(12) United States Patent
Deflandre et al.

(10) Patent No.: US 10,830,941 B2
(45) Date of Patent: Nov. 10, 2020

(54) LUMINAIRE WITH LIGHT GUIDE

(71) Applicant: SIGNIFY HOLDING B.V., Eindhoven (NL)

(72) Inventors: Thomas Deflandre, Amsterdam (NL); Jean-Francois Laporte, Laval (CA)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/326,334

(22) PCT Filed: Jul. 24, 2017

(86) PCT No.: PCT/EP2017/068588
§ 371 (c)(1),
(2) Date: Feb. 18, 2019

(87) PCT Pub. No.: WO2018/041470
PCT Pub. Date: Mar. 8, 2018

(65) Prior Publication Data
US 2019/0219758 A1 Jul. 18, 2019

(30) Foreign Application Priority Data
Aug. 29, 2016 (EP) .................................... 16186078

(51) Int. Cl.
*F21V 8/00* (2006.01)

(52) U.S. Cl.
CPC ........... *G02B 6/0091* (2013.01); *G02B 6/002* (2013.01); *G02B 6/0036* (2013.01); *G02B 6/0043* (2013.01); *G02B 6/0045* (2013.01); *G02B 6/0046* (2013.01); *G02B 6/0068* (2013.01)

(58) Field of Classification Search
CPC .................. G02B 6/001; G02B 6/0028; G02B 6/0045–0048; G02B 6/0073; G02B 6/091
See application file for complete search history.

(56) References Cited

U.S. PATENT DOCUMENTS

| 7,969,531 B1 | 6/2011 | Li et al. |
| 8,033,706 B1 | 10/2011 | Kelly et al. |
| 10,422,943 B2 * | 9/2019 | Munoz Fernandez ...................... G02B 6/0033 |
| 2008/0283860 A1 * | 11/2008 | Suehiro ................ G02B 6/0031 257/98 |

(Continued)

FOREIGN PATENT DOCUMENTS

| JP | 4 599298 B2 | 12/2010 |
| WO | 2012127389 A1 | 9/2012 |

(Continued)

*Primary Examiner* — Mariceli Santiago
(74) *Attorney, Agent, or Firm* — Daniel J. Piotrowski

(57) ABSTRACT

Disclosed is a luminaire (1) comprising a circular light guide (10), the light guide comprising an edge portion (11) in between a first major surface (15) and a second major surface (17), at least part (16) of the first major surface guide tapering in a direction away from said edge portion; a plurality of solid state lighting elements (40) arranged along said edge portion; and a plurality of outcoupling elements (30) arranged in a pattern on the second major surface of the circular light guide. The luminaire (1) may further include a controller (50) for individually controlling the solid state lighting elements (40) such as to configure the luminous output, e.g. the beam profile, of the luminaire.

14 Claims, 5 Drawing Sheets

(56) References Cited

U.S. PATENT DOCUMENTS

| | | | |
|---|---|---|---|
| 2011/0063855 A1* | 3/2011 | Vissenberg | G02B 6/0021 |
| | | | 362/311.12 |
| 2011/0242821 A1* | 10/2011 | Pan | G02B 5/045 |
| | | | 362/345 |
| 2012/0033445 A1* | 2/2012 | Desmet | G02B 6/0038 |
| | | | 362/606 |
| 2012/0106198 A1* | 5/2012 | Lin | G02B 6/0083 |
| | | | 362/609 |
| 2014/0043853 A1* | 2/2014 | Lavizzari | G02B 6/0021 |
| | | | 362/609 |
| 2014/0043856 A1 | 2/2014 | Thompson et al. | |
| 2017/0031080 A1* | 2/2017 | Speer | G02B 6/0055 |
| 2018/0210134 A1* | 7/2018 | Richards | G02B 6/0055 |

FOREIGN PATENT DOCUMENTS

| | | |
|---|---|---|
| WO | 2015036224 A1 | 3/2015 |
| WO | 2015055135 A1 | 4/2015 |
| WO | 2015145344 A1 | 10/2015 |

* cited by examiner

LUMINAIRE WITH LIGHT GUIDE

CROSS-REFERENCE TO PRIOR APPLICATIONS

This application is the U.S. National Phase application under 35 U.S.C. § 371 of International Application No. PCT/EP2017/068588, filed on Jul. 24, 2017 which claims the benefit of European Patent Application No. 16186078.8, filed on Aug. 29, 2016. These applications are hereby incorporated by reference herein.

FIELD OF THE INVENTION

The present invention relates to a luminaire comprising a light guide, the light guide comprising an edge portion in between a first major surface and a second major surface, a plurality of solid state lighting elements arranged along said edge portion and a plurality of outcoupling elements arranged in a pattern on the second major surface of the light guide.

BACKGROUND OF THE INVENTION

Solid state lighting (SSL), e.g. LED lighting, is rapidly gaining popularity because of its energy credentials and superior lifetime compared to traditional lighting, e.g. incandescent lighting, fluorescent lighting and halogen lighting. Nevertheless, market penetration of such SSL devices is not without challenges. For example, purchase cost of SSL devices is still higher than that of equivalent traditional light sources, even though the effective cost of such SSL devices is markedly lower due to their much longer lifetime. Another serious challenge is to provide a luminaire including SSL elements that offers the same visual experience as such traditional light sources. This is a far from trivial challenge, given that such luminaires typically comprise a plurality of SSL elements that act as point sources, which may lead to pixelation and glare in the luminous output of the SSL-based luminaire.

For this reason, some luminaires may include additional optical elements, e.g. diffusers, to diffuse the luminous output of the luminaire, thereby reducing pixelation and glare effects. One particular class of such diffusers are light guides, which are optical bodies comprising opposing total internal reflection surfaces, where light from an SSL element such as a LED is typically coupled into the light guide through an edge surface extending between the opposing total internal reflection surfaces. Light is coupled out of the light guide using outcoupling structures, e.g. on one of the surfaces, which disrupt the total internal reflection and allow for light to escape the light guide. Therefore, by arranging the outcoupling structures in a particular pattern, the luminous output distribution of the light guide may be controlled to a certain degree. An example of a light guide is disclosed in U.S. Pat. No. 8,033,706 B1.

In certain application domains, e.g. outdoor lighting, it may be aesthetically desirable to produce an asymmetric beam having good diffusiveness characteristics, i.e. having a uniformly lit light exit surface. It is not trivial to meet these requirements with light guides.

SUMMARY OF THE INVENTION

The present invention seeks to provide a luminaire with a light guide that can produce an asymmetric beam having good uniformity.

According to an aspect, there is provided a luminaire comprising an ellipsoid light guide comprising an edge portion in between a first major surface and a second major surface, at least part of the first major surface tapering in a direction away from said edge portion; a plurality of solid state lighting elements arranged along said edge portion; and a plurality of outcoupling elements arranged in a pattern on at least one of the first and second major surface of the ellipsoid light guide, the ellipsoid light guide is divided into a first radial segment and a second radial segment, the first radial segment having a constant thickness and comprising the edge portion, wherein the part of the first major surface belongs to the second radial segment and tapers from a boundary region with the first radial segment to a further edge portion of the circular light guide. Each radial segment may be a semi-circular segment or a symmetrical, semi-ellipsoidal segment. This has the advantage that only part of the edge of the light guide having a constant thickness, i.e. the edge portion of constant height of the first radial segment, needs to be optically coupled to the SSL elements in order to achieve asymmetric beam patterns having a desirable homogeneity. The further edge portion then has a decreasing height as it relates to the tapering portion of the light guide.

In this invention the expression "radial segment" is to be understood as meaning a radial sector of a circle of ellipsoid, or a circular or ellipsoidal segment, for example a semi-circular segment or a symmetrical, semi-ellipsoidal segment, in which symmetrical in this respect means that the segment has a mirror-plane perpendicular to the major surfaces.

In an embodiment the luminaire has the feature that the plurality of outcoupling elements is provided on the second major surface to facilitate light outcoupling by only one of the major surfaces, preferably by the second major surface or the preferably flat light exit surface for facilitating a uniformly illuminated appearance of the light exit surface.

It is particularly challenging to achieve an asymmetric beam having good uniformity, i.e. a beam formed with substantially the entire light exit surface, i.e. the second major surface, being lit in a diffuse manner, with an ellipsoid, e.g. circular, light guide, especially in scenarios where it may not be desirable to surround the entire edge or perimeter of the ellipsoid light guide with SSL elements. Moreover, the intrinsic symmetry of such light guides makes the generation of asymmetric beam profiles clearly challenging. The present invention is based on the insight that these challenges can be met by including a tapered portion in an ellipsoid light guide that tapers away from the SSL elements. This allows for the production of a high intensity luminous output in the vicinity of the SSL elements whereas more remote regions of the light guide may be effectively illuminated owing to the tapered part of the first major surface, which tapers, i.e. narrows, in a direction away from the SSL elements, thereby promoting light outcoupling.

In a preferred embodiment, the luminaire further comprises a controller arranged to individually control the solid state lighting elements. With such a controller, different beam profiles may be generated by enabling different sets of SSL elements within the luminaire. This for example is particularly advantageous in scenarios where the actual beam profile to be produced by the luminaire only becomes known once the luminaire is installed in a particular location. For example, for an outdoor luminaire such as a street lamp, the desired beam profile may depend on the width of the street and/or the location of the luminaire relative to the street such that it is desirable in such a scenario to configure the luminaire with the controller at the installation location of the luminaire. The shape of the ellipsoid light guide, e.g. a circular light guide, of the luminaire ensures that for each of such different beam profiles, a satisfactory homogeneity in the luminous output of the luminaire can be achieved. Ellipsoid in this respect means that the light guide has an ellipsoid shape when viewed/projected along a direction perpendicular to the second major surface of the light guide.

The luminaire may further comprise a wireless communication module coupled to the controller for remotely controlling the controller. This further facilitates ease of configuration of the luminaire, e.g. the selection of a particular set of SSL elements to be enabled by the controller for the purpose of generating a particular beam profile as previously explained, as the luminaire may be controlled from a remote location, thus avoiding the need having to physically access the luminaire, which may be problematic if the luminaire cannot be easily accessed, e.g. because it is installed at height.

In a preferred embodiment, the ellipsoid light guide is a circular light guide. The circular light guide provides a uniformly illuminated circular light exit surface which is an appreciated, convenient shape for street lighting luminaires. The pattern of outcoupling elements may include a first pattern on the first radial segment and a second pattern on the second radial segment, the first pattern being different to the second pattern in order to achieve the desired homogeneity. For example, the second pattern may have a higher density than the first pattern in order to increase the likelihood of light being coupled out of the light guide to compensate for the fact that light originating from the SSL elements has to travel to a substantial portion of the light guide before reaching the second radial segment.

In an embodiment, the first pattern is a first Gaussian spread and the second pattern is a second Gaussian spread having a spread angle twice as large as the first Gaussian spread. It has been found that such patterns achieve a particularly uniform luminous distribution across the second major surface of the light guide, i.e. a distribution in which substantially the entire second major surface is illuminated.

In an alternative embodiment, the edge portion surrounds the ellipsoid light guide, and wherein the ellipsoid light guide is radially tapered from the edge portion to its center in order to achieve the desired luminous characteristics of the luminaire.

The outcoupling elements are not particularly limited and any suitable outcoupling elements may be used on the ellipsoid light guide. For example, the second major surface may be textured to form said outcoupling elements. Alternatively, the outcoupling elements comprise 3-D optical elements or printed white dots.

In an embodiment, the second major surface is planar. However, the ellipsoid light guide including the second major surface may have any suitable shape, e.g. a curved shape, a bent shape, a dome shape, and so on.

The ellipsoid light guide may be made of any suitable material. In an embodiment, the ellipsoid light guide comprises a polymer material selected from polycarbonate, poly(methyl methacrylate) and polyethylene terephthalate. PMMA is particularly mentioned. The ellipsoid light guide may be manufactured in a cost-effective manner using such optical grade polymer materials, e.g. using a moulding technique such as injection moulding.

In some embodiments, the SSL elements may be identical. However, in alternative embodiments, the plurality of SSL elements may contain SSL elements adapted to produce respective luminous outputs having different spectral compositions, e.g. different colour LEDs. This has the advantage that in addition to the beam profile, the spectral composition of the luminous output of the luminaire may also be configured.

In some embodiments, uniformity of the luminous output distribution of the luminaire may not be desirable, for example in embodiments in which the luminous output comprises some sort of aesthetic pattern, e.g. concentric circles or the like. In such embodiments, the luminaire may further comprise at least one optical element optically coupled to the second major surface to achieve such optical effects. For example, the at least one optical element may comprise a plurality of lenses such as toric lenses.

The luminaire according to embodiments of the present invention may be an outdoor luminaire such as a street lamp, which in advantageous embodiments may be configured in situ in order to achieve a desired luminous distribution with the luminaire as explained in more detail above. However, it should be understood that embodiments of the present invention are not limited to outdoor luminaires such as street lamps. Any suitable type of luminaire, e.g. indoor luminaires, may benefit from the concepts and embodiments of the present invention as described in the present application.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
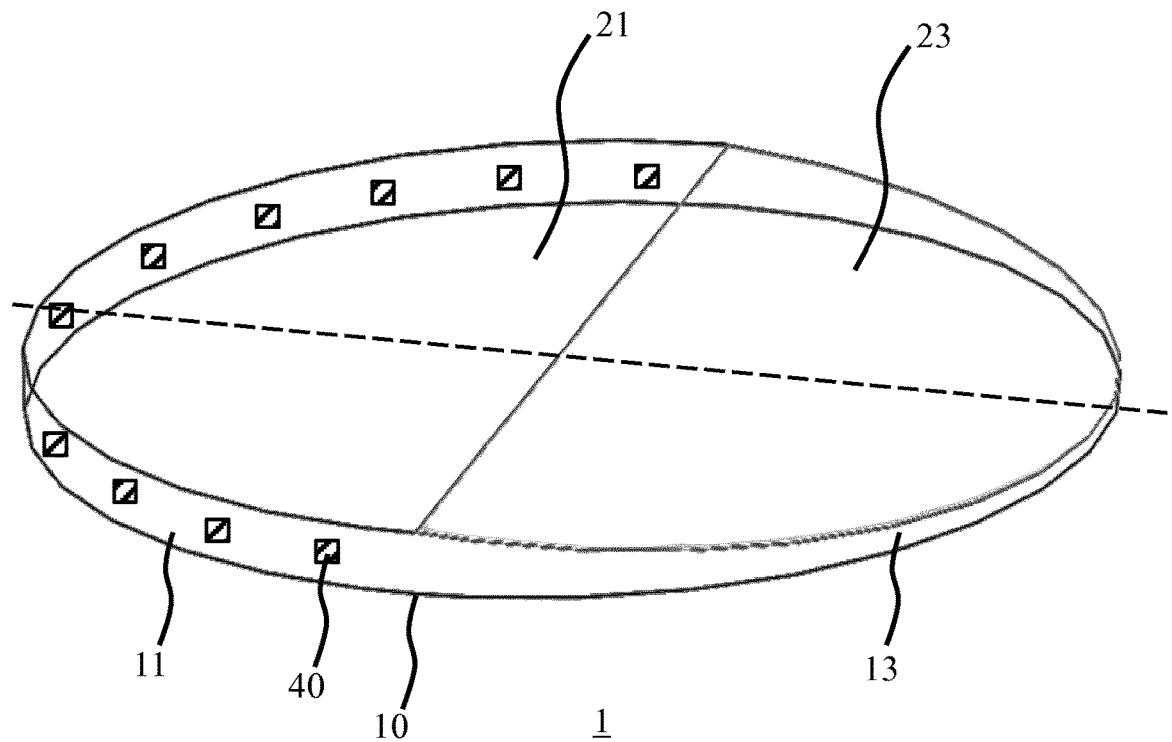
FIG. 1 schematically depicts a perspective view of a luminaire according to an example embodiment.

It should be understood that the Figures are merely schematic and are not drawn to scale. It should also be understood that the same reference numerals are used throughout the Figures to indicate the same or similar parts.

Figure 2:
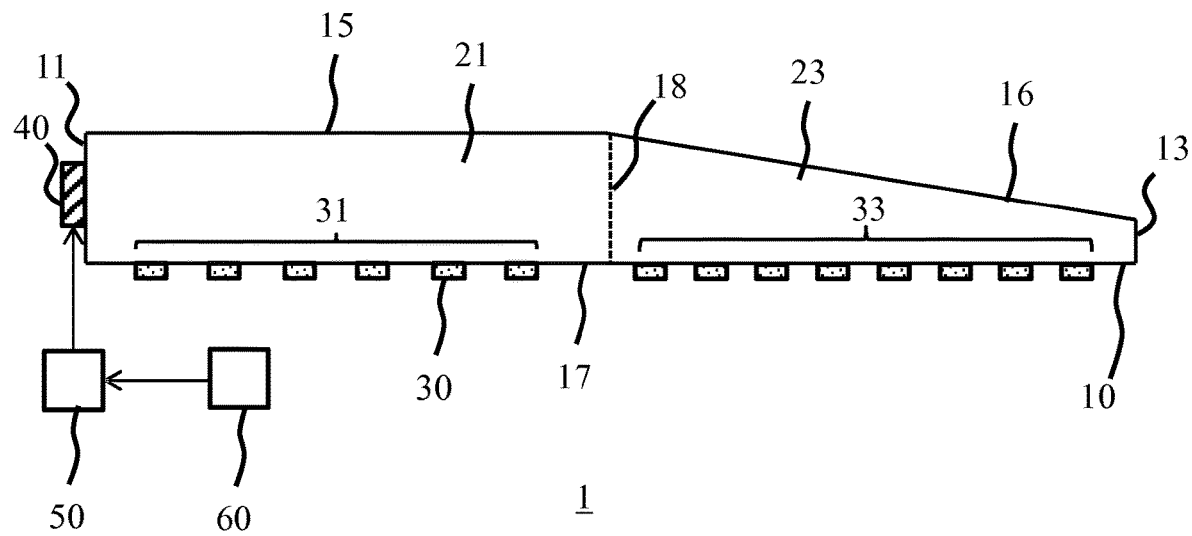
FIG. 2 schematically depicts a cross-sectional view of a luminaire according to FIG. 1.

FIG. 1 schematically depicts a perspective view of an aspect of a luminaire 1 according to an embodiment, and FIG. 2 schematically depicts a cross-section of the luminaire 1 along the dashed line in FIG. 1. The luminaire 1 in this example embodiment comprises an ellipsoid light guide 10. In the context of the present application, an ellipsoid light guide is a light guide that has an ellipsoid shape when viewed or projected along a direction perpendicular to a major surface of the light guide, e.g. the second major surface as described below.

In at least some embodiments, the ellipsoid light guide 10 is a circular light guide. A circular light guide may be considered a special case of an ellipsoid light guide, as it is well-known from mathematics that a circle is a special case of an ellipse. The ellipsoid light guide 10 comprises a first major surface 15 opposite a second major surface 17, which surfaces act as total internal reflection (TIR) surfaces of the ellipsoid light guide 10. As will be known per se, light incident at such TIR surfaces under an angle below the critical angle of the TIR surface is internally reflected, which 'traps' light between the first major surface 15 and the second major surface 17, such that the light within the light guide 10 is guided between these surfaces.

Outcoupling elements 30 may be provided on at least one of the major surfaces 15, 17 (here provided on the second major surface 17). The outcoupling elements 30 may be arranged in a defined pattern in order to control the locations at which light is coupled out of the light guide 10, e.g. to control the uniformity of the luminous output of the light guide 10. For example, a lower density of such outcoupling elements 30 may be provided proximal to a light source, e.g. a SSL element 40 compared to more distal regions of the light guide 10, in order to avoid an excessive amount of light being coupled out of the light guide 10 proximal to such a light source. The outcoupling elements 30 may be provided in any suitable manner. For example, the outcoupling elements 30 may be formed by roughening, e.g. texturing, the second major surface 17, for example by sandblasting, char milling, etcetera. Alternatively, the outcoupling elements 30 may be formed by positioning dedicated optical elements, e.g. 3-D elements such as lenslets, spheres, cones, prisms or the like, on the second major surface 17. The outcoupling elements 30 alternatively may be formed as white dots, e.g. through ink screen printing, inkjet printing or the like. Many other suitable embodiments of such outcoupling elements 30 will be immediately apparent to the skilled person.

In the example embodiment shown in FIG. 1 and FIG. 2, the ellipsoid light guide 10 comprises a first radial segment 21 and a second radial segment 23, which segments combine to form the light guide 10. In this embodiment, the ellipsoid light guide 10 preferably is a circular light guide 10, Then the first radial segment 21 and the second radial segment 23 are semi-circular radial segments. However, in this embodiment shown, the light guide is an ellipsoidal light guide, although it should be understood that other shape radial segments may be contemplated. The first radial segment 21 is delimited by an outer edge 11 of constant height extending between the first major surface 15 and the second major surface 17, i.e. the first radial segment 21 may be a segment of constant thickness. The second radial segment 23 may include a tapered surface portion 16 of the first major surface 15, which tapered surface portion 16 tapers from the boundary 18 between the first radial segment 21 and the second radial segment 23. In other words, the second radial segment 23 decreases in thickness at increasing distance from the boundary 18. In an embodiment, the second radial segment 23 is linearly tapered, such that the second radial segment 23 is delimited by a further edge 13 of the circular light guide 10 extending between the first major surface 15 and the second major surface 17, which further edge 13 decreases in height at increasing distance from the boundary 18 along the circumference of the circular light guide 10.

Along the edge 11, a plurality of SSL elements 40, e.g. LEDs are arranged such that the luminous output of the SSL elements 40 is coupled into the first radial segment 21 of the light guide 10 upon the SSL elements 40 being engaged by the controller 50. The controller 50 preferably is adapted to individually control the respective SSL elements 40, such that the controller 50 may select which SSL elements 40 along the edge 11 are to be deployed in order to generate a particular beam profile with the luminaire 1. The SSL elements 40 may be identical SSL elements or may contain different SSL elements, e.g. the SSL elements 40 may include different SSL elements arranged to produce respective luminous outputs having different spectral compositions, e.g. light of different colours. For example, the SSL elements 40 may include red LEDs, green LEDs and blue LEDs. Alternatively, the SSL elements 40 may include cool white LEDs, warm white LEDs and/or daylight LEDs. In such embodiments, the controller 50 may control the beam shape and/or the spectral composition of the luminous output produced with the luminaire 1. Any suitable type of SSL elements 40 may be used for this purpose. The SSL elements 40 may directly optically coupled into the light guide 10 through the edge 11 or alternatively may be coupled into the light guide 10 through the edge 11 using an optical element such as a collimator or the like, for example to ensure that substantially all light emitted by the SSL elements 40 is coupled into the light guide 10.

In an embodiment, the luminaire 1 further comprises a wireless communication module 60 coupled to the controller 50 for remotely controlling the controller 50. The wireless controller 60 may be adapted to communicate with a remote device, e.g. a dedicated remote controller, remote control functionality programmed onto a smart device such as a mobile phone, tablet computer or the like, and so on, using any suitable wireless communication protocol, e.g. Wi-Fi, Bluetooth, Zigbee, NFC, a mobile communication protocol, and so on, which communication may be secured in some embodiments using any suitable encryption technique. In this manner, the luminaire 1 may be remotely configured by controlling the controller 50 through the wireless communication module 60, e.g. to configure the beam shape to be produced by the luminaire 1 by instructing the controller 50 to select the appropriate SSL elements 40 for producing this beam shape, such that the beam shape matches the required illumination function to be provided by the luminaire 1. This for instance is particularly advantageous in outdoor lighting applications, e.g. street lamps, in which the luminous profile to be produced by the street lamp may be configured to match the mounting position and/or the street dimensions, e.g. width of the street. However, such remote configurability of the luminaire 1 may be equally useful in other application domains, e.g. indoor lighting, for example to create certain aesthetic effects with the luminaire 1.

The SSL elements 40 may be mounted along the edge 11 in any suitable manner. For example, the SSL elements 40 may be mounted on an inner surface of a housing (not shown) of the luminaire 1 facing the edge 11, may be mounted on a carrier (not shown) attached to the housing or the light guide 10, may be directly attached to the light guide 10, and so on. Many other suitable arrangements will be immediately apparent to the skilled person.

The first radial segment 21 preferably has a constant thickness such that a substantial portion of the light from the SSL elements 40 coupled into the light guide 10 may travel through the first radial segment 21 through total internal reflection towards the second radial segment 23, where emission of this light from the light guide 10 is promoted by the tapered (slanted) surface portion 16 of the first major surface 15. This is at least partially because the slanted surface portion 16 reflects incident light towards the opposing second major surface 17 under an increased angle (compared to two opposing parallel surfaces) such that there is an increased likelihood of such reflected light rays falling onto the second major surface 17 under an angle exceeding the critical angle at which total internal reflection takes place, thereby promoting escape of these light rays from the light guide 10 through the second major surface 17, i.e. the light exit surface of the light guide 10.

In order to achieve a substantial uniform luminous output from the light exit surface of the ellipsoid light guide 10, e.g. a circular light guide, the pattern of outcoupling elements 30 may be divided into a first pattern 31 of outcoupling elements 30 on the portion of the second major surface 17 of the first radial segment 21 and a second pattern 33 of outcoupling elements 30 on the portion of the second major surface 17 of the second radial segment 23, with the first pattern being different to the second pattern. More specifically, the second pattern 33 may have a higher pattern density than the first pattern 31 such that the likelihood of light exiting the second radial segment 23 is higher than the likelihood of light exiting the first radial segment 21. In this manner, the fact that there is a higher flux of light in the first radial segment 21 by virtue of this segment being proximal to the SSL elements 40 may be compensated with the difference in the patterns 31, 33 of outcoupling elements 30, e.g. to ensure a relatively even distribution of light emission across the second major surface 17 or at least to ensure that substantially the entire major surface 17 emits light, albeit with different intensities in different regions.

Figure 3:
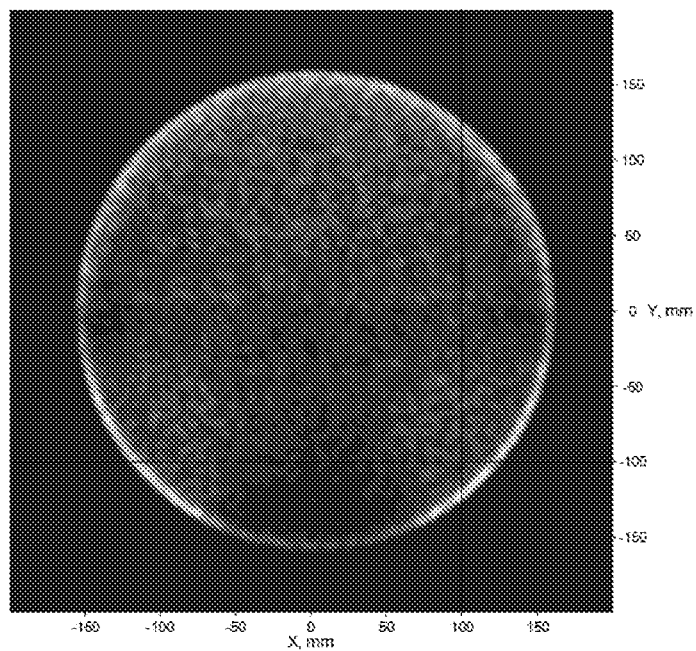
FIG. 3 shows images of luminous output distributions achieved with a luminaire according to example embodiments.
Figure 3:
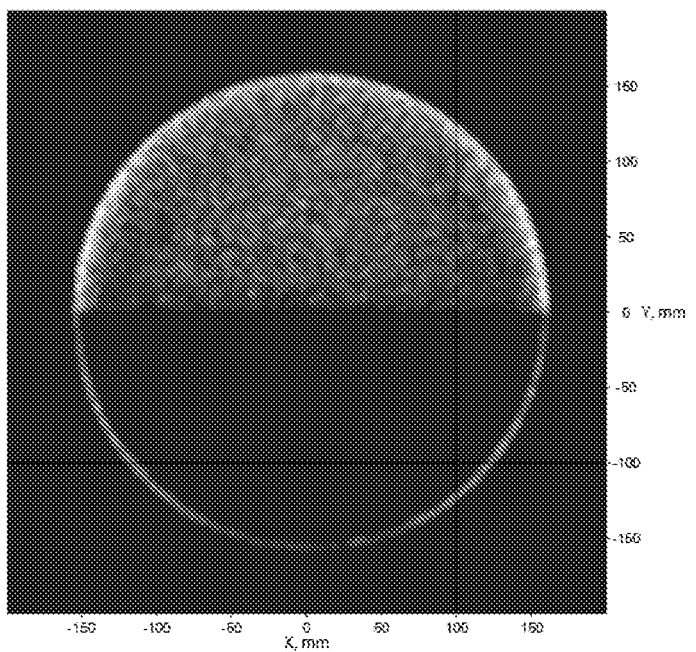

FIG. 3 depicts two photographic images of a luminaire 1 according to two embodiments of the present invention, in which in the top image the outcoupling elements 30 on the second major surface 17 are arranged based on a Gaussian spread function in which the Gaussian angle or spread angle on the first radial segment 21 is half (5°) that of the Gaussian angle or spread angle on the second radial segment 23 (10°). The second radial segment 23 is highlighted in each image with the white arrow. If this ratio (spread angle of outcoupling elements 30 on the second radial segment 23 over the spread angle of the outcoupling elements on the first radial segment 21) is approximately 2, a satisfactory uniform illumination of the second major surface 17 may be achieved. On the other hand, in the bottom image, an identical spread angle for the Gaussian spread of outcoupling elements 30 was deployed for the first radial segment 21 and the second radial segment 23. Consequently, the majority of light coupled into the light guide 10 through the edge 11 was emitted by the portion of the second major surface 17 of the first radial segment 21, thus leading to poor uniformity in the luminous output of the luminaire 1.

Figure 4:
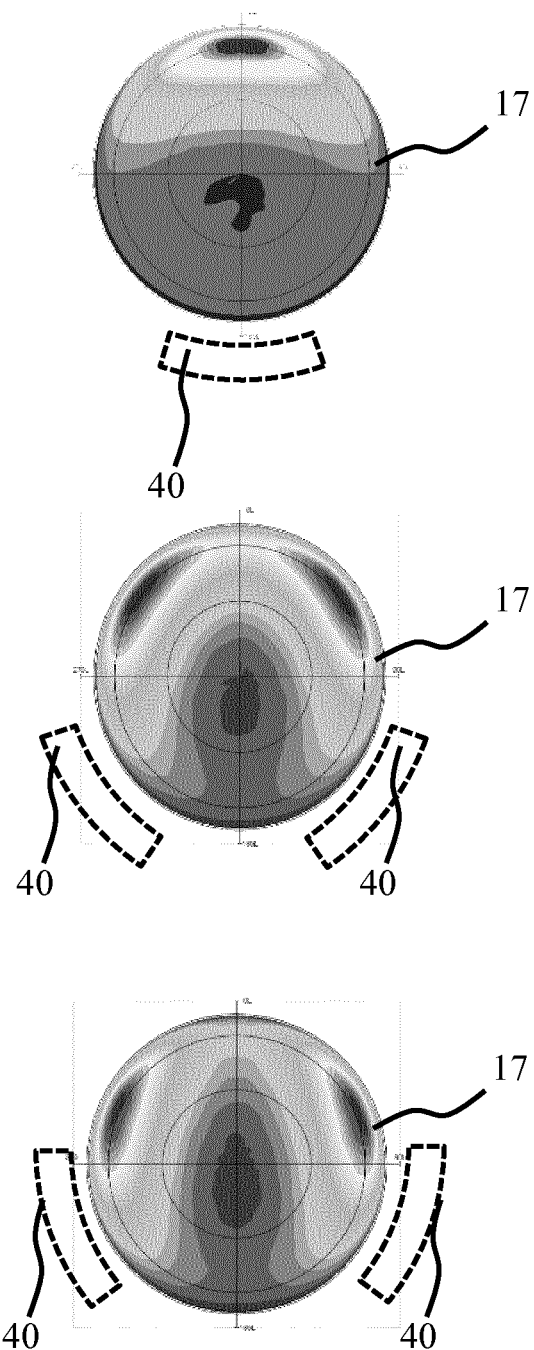
FIG. 4 schematically depicts luminous output profiles achieved with a luminaire according to an example embodiment in different configurations.

FIG. 4 schematically depicts three different luminous output profiles (beam profiles) emitted from the second major surface 17 of the luminaire 1 according to an embodiment of the present invention, in which different groups of SSL elements 40 were enabled with the controller 50. This clearly demonstrates that different (asymmetric) beam profiles may be generated by enabling different SSL elements along the edge 11 of the ellipsoid light guide 10, whilst retaining a uniform luminous output across the second major surface 17.

Figure 5:
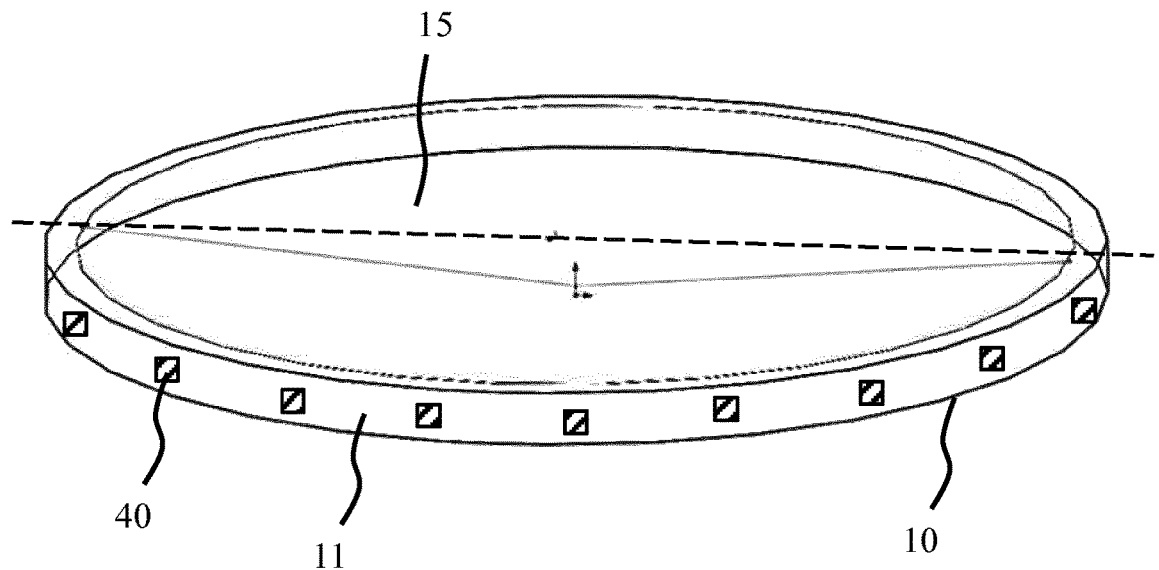
FIG. 5 schematically depicts a perspective view of a luminaire according to another example embodiment.
Figure 6:
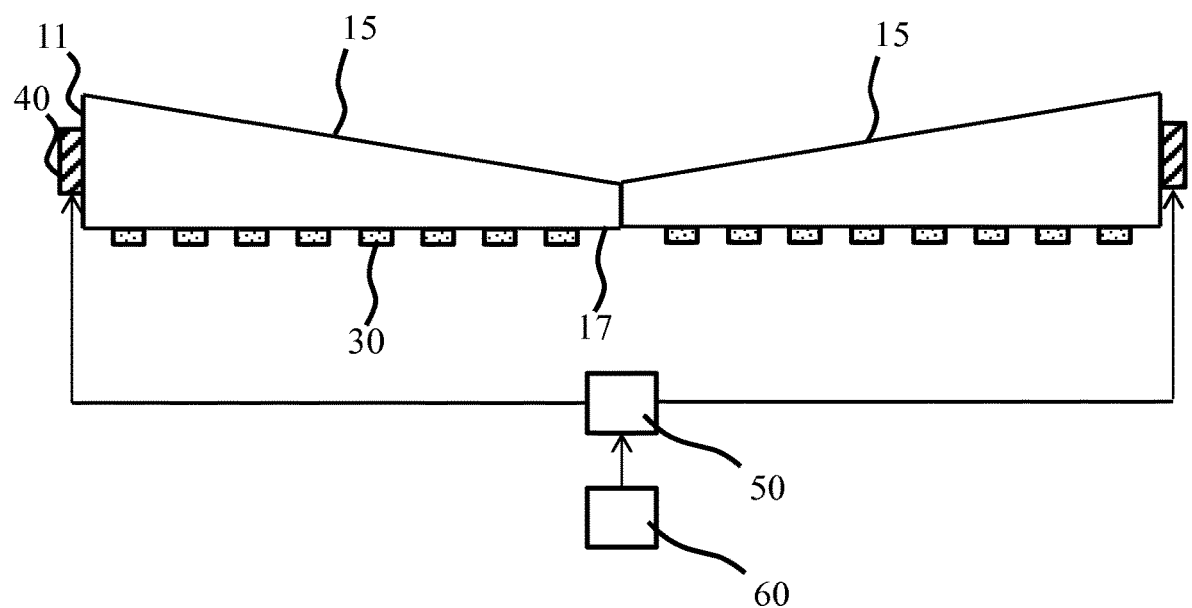
FIG. 6 schematically depicts a cross-sectional view of a luminaire according to FIG. 5.

FIG. 5 schematically depicts a perspective view of an aspect of a luminaire 1 according to another embodiment, and FIG. 6 schematically depicts a cross-section of the luminaire 1 along the dashed line in FIG. 5. The light guide 10 in this example embodiment is radially tapered from the edge portion 11 to its center, i.e. contains a radially tapered first major surface 15, such that the edge portion 11 surrounds the ellipsoid light guide 10, e.g. a circular light guide. In this embodiment, the SSL elements 40 may surround the light guide 10, i.e. may be arranged along the entire edge 11. In operation, pairs of SSL elements 40, or pairs of groups of SSL elements may be engaged with the controller 50, e.g. in response to a configuration signal received through the wireless commutation module 60, such that the luminous distribution generated with the luminaire 1 is symmetrical in respect of the dashed line in FIG. 5, e.g. to achieve uniform illumination of the second major surface 17 as previously explained. The pattern of outcoupling elements 30 may be arranged in any suitable pattern in order to aid the achievement of such uniform illumination of the second major surface 17 as explained in more detail above.

Figure 7:
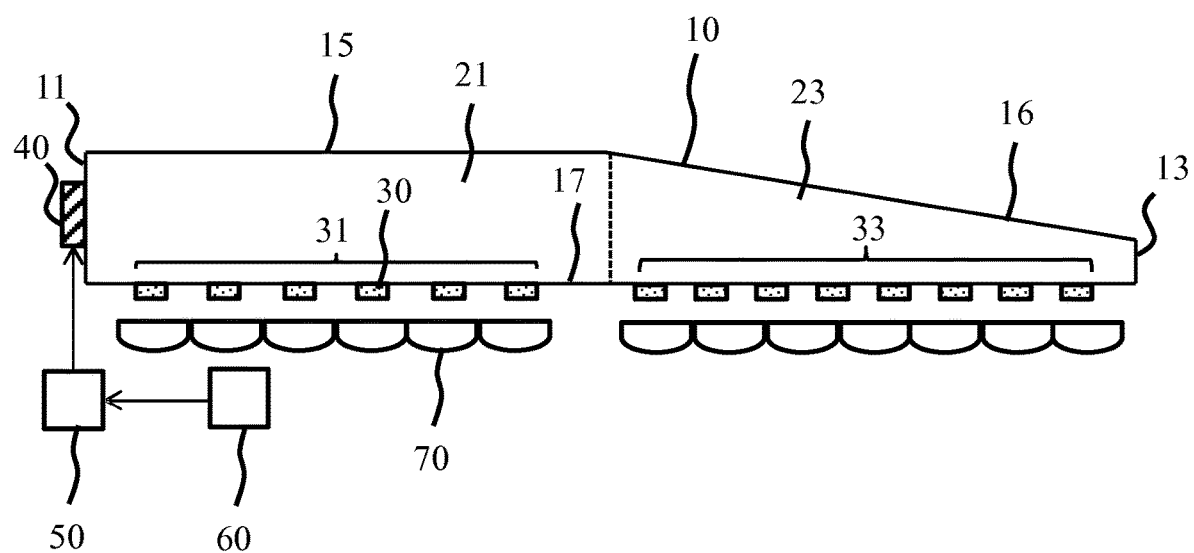
FIG. 7 schematically depicts a cross-sectional view of a luminaire according to yet another example embodiment.

In some embodiments, e.g. embodiments in which the luminaire 1 is designed to achieve certain aesthetic effects rather than a uniform, i.e. smooth or non-pixelated, luminous output, the luminaire 1 may further comprise at least one optical element optically coupled to the second major surface 17 in order to shape the luminous output produced by the second major surface 17. For example, as schematically depicted in FIG. 7, the luminaire 1 may comprise a plurality of optical elements 70, e.g. lenses such as toric lenses, which for example may be arranged to produce a certain light pattern, e.g. a light pattern of concentric rings by way of non-limiting example. It will be immediately understood by the skilled person that the shape of such a light pattern is in no way limited and that any suitable light pattern may be generated in this manner.

The ellipsoid, e.g. circular, light guide 10 in the embodiments of the luminaire 1 of the present invention may be made in any suitable manner using any suitable material or combination of materials. For example, in some embodiments the light guide 10 may be made of an optical grade polymer (or polymer blend) using one or more polymers such as polycarbonate, poly(methyl methacrylate) and polyethylene terephthalate, which may facilitate the manufacture of the light guide 10 in a cost-effective manner, e.g. using moulding technique such as injection moulding for example. However, it should be understood that the light guide 10 is not limited to these example materials and manufacturing methods.

Moreover, although the second major surface 17 and in some embodiments part of the first major surface 15 have been depicted as planar surfaces, it should be understood that this is by way of non-limiting example only as embodiments in which these surfaces are curved or bent are equally feasible.

As previously explained, the luminaire 1 in some embodiments may be an outdoor luminaire such as a street lamp, of which the luminous output profile may be configurable, e.g. by remotely controlling the controller 50 through the wireless communication module 60, such that the luminous output of the luminaire 1 may be tailored to match a desired optical performance. However, the luminaire 1 is not limited to such applications; for example, it is equally feasible that a luminaire 1 is an indoor luminaire, which for example may be configurable to achieve different aesthetic luminous output profiles by configuration of the luminaire 1 as explained above.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A luminaire comprising:
an elliptical plate-shaped light guide comprising an edge portion in between a first major surface and a second major surface, at least portion of the first major surface guide tapering in a direction away from said edge portion;
a plurality of solid state lighting elements arranged along said edge portion;
a plurality of outcoupling elements arranged in a pattern on at least one of the major surfaces of the elliptical plate-shaped light guide,
the elliptical plate-shaped light guide is divided into a first radial segment and a second radial segment, the first radial segment having a constant thickness and comprising the edge portion; wherein the portion of the first major surface belongs to the second radial segment and tapers from a boundary region with the first radial segment to a further edge portion of the elliptic plate-shaped light guide; and
wherein the pattern includes a first pattern on the first radial segment and a second pattern on the second radial segment, the first pattern being different to the second pattern.

2. The luminaire of claim 1, further comprising a controller arranged to individually control the solid state lighting elements.

3. The luminaire of claim 2, further comprising a wireless communication module coupled to the controller for remotely controlling the controller.

4. The luminaire of claim 1, wherein the elliptical plate-shaped light guide is a circular plate-shaped light guide.

5. The luminaire of claim 1, wherein each radial segment is a semi-circular segment or a symmetrical, semi-elliptical segment.

6. The luminaire of claim 1, wherein the first pattern is a first Gaussian spread and the second pattern is a second Gaussian spread having a spread angle twice as large as the first Gaussian spread.

7. The luminaire of claim 1, wherein the plurality of outcoupling elements is provided on the second major surface.

8. The luminaire of claim 1, wherein said second major surface is textured to form said outcoupling elements, or wherein the outcoupling elements comprise 3-D optical elements or printed white dots.

9. The luminaire of claim 1, wherein the second major surface is planar.

10. The luminaire of claim 1, wherein the elliptical plate-shaped light guide comprises a polymer material selected from polycarbonate, poly(methyl methacrylate) and polyethylene terephthalate.

11. The luminaire of claim 1, wherein the plurality of solid state lighting elements contains solid state elements adapted to produce respective luminous outputs having different spectral compositions.

12. The luminaire of claim 1, wherein the luminaire is a street lamp.

13. A luminaire comprising:
an elliptical plate-shaped light guide comprising an edge portion in between a first major surface and a second major surface, at least portion of the first major surface guide tapering in a direction away from said edge portion;
a plurality of solid state lighting elements arranged along said edge portion;
a plurality of outcoupling elements arranged in a pattern on at least one of the major surfaces of the elliptical plate-shaped light guide,
the elliptical plate-shaped light guide is divided into a first radial segment and a second radial segment, the first radial segment having a constant thickness and comprising the edge portion; wherein the portion of the first major surface belongs to the second radial segment and tapers from a boundary region with the first radial segment to a further edge portion of the elliptic plate-shaped light guide; and
a at least one optical element optically coupled to the second major surface, wherein the at least one optical element comprises a plurality of lenses.

14. The luminaire of claim 13, wherein the at least one optical element comprises a plurality of toric lenses.

* * * * *